US012620678B2

(12) United States Patent
Li et al.

(10) Patent No.: US 12,620,678 B2
(45) Date of Patent: May 5, 2026

(54) BATTERY CELL, MANUFACTURING METHOD, MANUFACTURING SYSTEM, BATTERY AND ELECTRICAL DEVICE

(71) Applicant: CONTEMPORARY AMPEREX TECHNOLOGY (HONG KONG) LIMITED, Hong Kong (CN)

(72) Inventors: Quankun Li, Ningde City (CN); Wenzhong Liu, Ningde City (CN); Huasheng Su, Ningde City (CN); Qifan Zou, Ningde City (CN); Peng Wang, Ningde City (CN)

(73) Assignee: Contemporary Amperex Technology (HONG KONG) Limited, Hong Kong (CN)

( * ) Notice: Subject to any disclaimer, the term of this patent is extended or adjusted under 35 U.S.C. 154(b) by 775 days.

(21) Appl. No.: 17/821,807

(22) Filed: Aug. 24, 2022

(65) Prior Publication Data

US 2022/0407192 A1    Dec. 22, 2022

Related U.S. Application Data

(63) Continuation of application No. PCT/CN2021/080386, filed on Mar. 12, 2021.

(51) Int. Cl.
*H01M 50/533* (2021.01)
*H01M 50/107* (2021.01)
(Continued)

(52) U.S. Cl.
CPC ....... *H01M 50/533* (2021.01); *H01M 50/107* (2021.01); *H01M 50/152* (2021.01);
(Continued)

(58) Field of Classification Search
CPC ............. H01M 50/533; H01M 50/559; H01M 10/0431; H01M 50/538
See application file for complete search history.

(56) References Cited

U.S. PATENT DOCUMENTS

2002/0004162 A1 * 1/2002 Satoh .................. H01M 50/534
                                                     429/211
2009/0064487 A1   3/2009 Hashimoto et al.
                        (Continued)

FOREIGN PATENT DOCUMENTS

CN      201623207 U   11/2010
CN      202103110 U   1/2012
                 (Continued)

OTHER PUBLICATIONS

First Office Action received in the corresponding Chinese Application 202180013912.0, mailed May 5, 2023.
(Continued)

*Primary Examiner* — Allison Bourke
*Assistant Examiner* — Kayla Elaine Clary
(74) *Attorney, Agent, or Firm* — K&L Gates LLP

(57) ABSTRACT

A battery cell, a manufacturing method, a manufacturing system, a battery and an electrical device are provided. In some embodiments, the battery cell of includes an electrode component; a casing for accommodating the electrode component and having an opening; an end cap for sealing the opening of the casing; a current collector member for electrically connecting the electrode component and the end cap, the current collector member including a base portion and an elastic portion connected to the base portion. The elastic portion abuts against the electrode component, so the elastic portion is not required to be welded to the electrode component, thus reducing metal particles to lower the risk of short circuit. The elastic portion is able to deform when squeezed by the electrode component and release the pres-
(Continued)

sure therebetween by deformation, reducing the risk of crushing the electrode component due to excessive pressure.

18 Claims, 9 Drawing Sheets

(51) Int. Cl.

| | | |
|---|---|---|
| *H01M 50/152* | (2021.01) | |
| *H01M 50/536* | (2021.01) | |
| *H01M 50/559* | (2021.01) | |
| *H01M 50/566* | (2021.01) | |

(52) U.S. Cl.
CPC ....... *H01M 50/536* (2021.01); *H01M 50/559* (2021.01); *H01M 50/566* (2021.01); *H01M 2220/20* (2013.01)

(56) References Cited

U.S. PATENT DOCUMENTS

| | | | |
|---|---|---|---|
| 2009/0208830 A1 | 8/2009 | Okabe et al. | |
| 2010/0129703 A1* | 5/2010 | Caumont | H01M 10/613 |
| | | | 361/699 |
| 2011/0229748 A1 | 9/2011 | Sugii et al. | |
| 2014/0162097 A1 | 6/2014 | Fuhr et al. | |
| 2020/0028132 A1 | 1/2020 | Muratsu et al. | |
| 2020/0212405 A1* | 7/2020 | Wong | H01M 50/184 |

FOREIGN PATENT DOCUMENTS

| | | | |
|---|---|---|---|
| CN | 203553278 U | * | 4/2014 |
| CN | 103887467 A | | 6/2014 |
| CN | 107946665 A | | 4/2018 |
| CN | 107946665 | | 11/2019 |
| CN | 209981351 U | | 1/2020 |

OTHER PUBLICATIONS

The extended European search report received in the corresponding European Application 21920113.4, mailed Dec. 14, 2023.
International Search Report and Written Opinion received in PCT Application PCT/CN2021/080386 on Dec. 8, 2021.

* cited by examiner

1

2

6

7

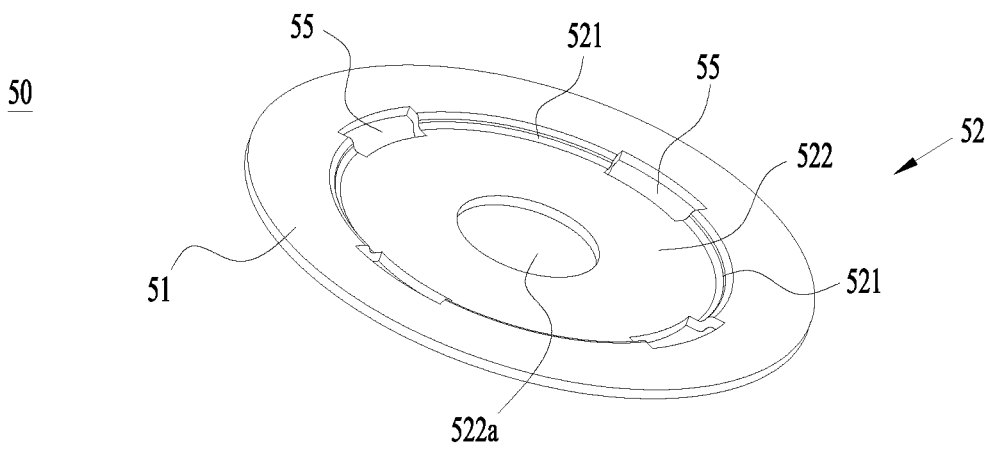

FIG. 15

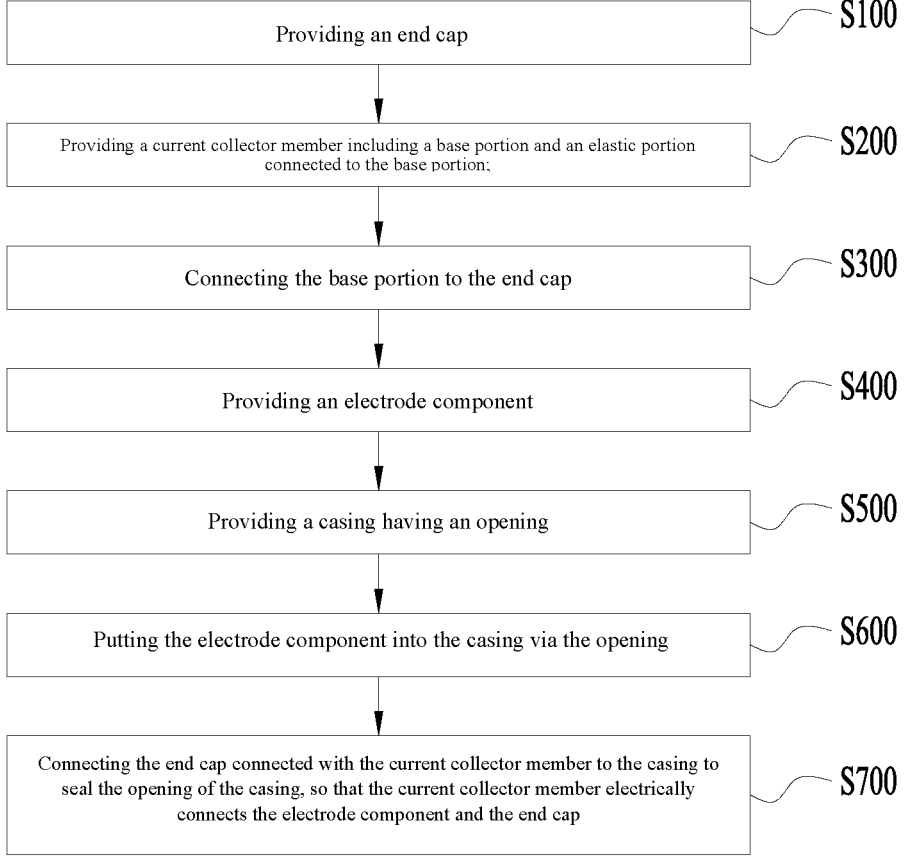

| | |
|---|---|
| Providing an end cap | S100 |
| Providing a current collector member including a base portion and an elastic portion connected to the base portion; | S200 |
| Connecting the base portion to the end cap | S300 |
| Providing an electrode component | S400 |
| Providing a casing having an opening | S500 |
| Putting the electrode component into the casing via the opening | S600 |
| Connecting the end cap connected with the current collector member to the casing to seal the opening of the casing, so that the current collector member electrically connects the electrode component and the end cap | S700 |

FIG. 16

BATTERY CELL, MANUFACTURING METHOD, MANUFACTURING SYSTEM, BATTERY AND ELECTRICAL DEVICE

CROSS-REFERENCE TO RELATED APPLICATIONS

This application is a continuation of International Application PCT/CN2021/080386, filed Mar. 12, 2021, and entitled "BATTERY CELL, BATTERY, ELECTRICAL DEVICE, METHOD AND EQUIPMENT FOR MANU-FACTURING BATTERY CELLS", which is incorporated herein by reference in its entity.

TECHNICAL FIELD

The present disclosure relates to the technical field of battery, and in particular, to a battery cell, a manufacturing method, a manufacturing system, a battery and an electrical device.

BACKGROUND

A battery cell comprises an electrode component which is electrically connected an electrode terminal or an end cap through a current collector member, and the current collector member is welded to the electrode component. Metal particles may be generated during the welding, and the residual metal particles in the battery cell may cause the risk of short circuit.

SUMMARY

The present disclosure provides a battery cell, a manu-facturing method, a manufacturing system, a battery and an electrical device, which can reduce the risk of short circuit.

According to a first aspect, the embodiments of The present disclosure provide a battery cell including an elec-trode component; a casing for accommodating the electrode component and having an opening; an end cap for sealing the opening of the casing; a current collector member for electrically connecting the electrode component and the end cap, the current collector member comprising a base portion and an elastic portion connected to the base portion, the base portion and the elastic portion being located between the end cap and the electrode component, the base portion being configured to connect the end cap, at least a part of the elastic portion protruding from a surface of base portion facing the electrode component and abutting the electrode component, and the elastic portion being configured to be able to deform when squeezed by the electrode component.

In the above solutions, the elastic portion of the current collector member abuts against the electrode component, so the elastic portion is not required to be welded to the electrode component, thus reducing the residual metal par-ticles in the battery cell to lower the risk of short circuit. The elastic portion abuts against the electrode component and may deform when squeezed by the electrode component to release the pressure between them, reducing the risk of crushing the electrode component due to excessive pressure. The elastic portion produces an elastic force after compres-sion deformation, and under the action of the elastic force, the elastic portion is kept in contact with the electrode component, reducing the contact resistance between the electrode component and the elastic portion to improve the overcurrent capacity.

In some embodiments, the elastic portion includes a bending zone and a connecting zone, one end of the bending zone being connected to the base portion and bent toward the electrode component, and the connecting zone being con-nected to the other end of the bending zone and abutting the electrode component.

In the above solutions, when the elastic portion abuts against the electrode component and is squeezed by the electrode component, both the connecting zone and the bending zone may deform to release the pressure between the electrode component and the elastic portion, reducing the risk of crushing the electrode component due to exces-sive pressure. The connecting zone and the bending zone produce an elastic force after compression deformation, and under the action of the elastic force, the connecting zone and the electrode component are kept in contact, reducing the contact resistance between the electrode component and the elastic portion to improve the overcurrent capacity.

In some embodiments, the base portion includes a first through-hole, and one end of the bending zone is connected to a hole wall of the first through-hole.

In some embodiments, in a thickness direction of the base portion, a projection of the connecting zone is within a projection of the first through-hole. When squeezed by an electrode component, the connecting zone moves towards the first through-hole, that is, the first through-hole can reserve some deformation space for the connecting zone, and the base portion may not impede the deformation of the connecting zone.

In some embodiments, an angle between the bending zone and the base portion is greater than 90 degrees.

In some embodiments, the hole wall of the first through-hole includes two first side walls opposing each other in a circumferential direction and two second side walls oppos-ing each other in a radial direction of the base portion. A dimension of the first side walls in the radial direction is greater than a dimension of the second side walls in the circumferential direction, and the bending zone extends from the first side walls; or, a dimension of the first side walls in the radial direction is less than a dimension of the second side walls in the circumferential direction, and the bending zone extends from the second side walls. The bending zone is connected to the larger side wall so as to ensure the connection strength and the overcurrent area between the bending zone and the base portion.

In some embodiments, a plurality of first through-holes are provided, and the wall of each the first through-hole is connected with the elastic portion. On the premise of satis-fying the contact area between an electrode component and a current collector member, the strength of each elastic portion can be reduced and the elasticity of each elastic portion can be improved by increasing the number of elastic portion, so that each elastic portion may deform more easily under compression.

In some embodiments, at least a part of plurality of first through-holes are arranged at intervals in the circumferential direction of the base portion. Correspondingly, at a least a part of multiple elastic portions are arranged along the circumferential interval, so that the contact surface between multiple elastic portions and tab portions can be evenly distributed, and the current can be transmitted outwards more evenly.

In some embodiments, the base portion comprises a central zone, a first annular zone and a first transition zone, the first annular zone surrounding an outer side of the central zone and spaced from the central zone, and the first transi-tion zone extending in the radial direction of the base portion and connected between the central zone and the first annular zone. A plurality of first transition zones are provided and arranged by equal intervals in the circumferential direction of the base portion, and the first through-hole is formed between two adjacent first transition zones. A wall of the central zone facing the first annular zone is connected to the bending zone.

In some embodiments, the base portion further includes a second annular zone and a second transition zone, the second annular zone surrounding an outer side of the first annular zone and spaced from the first annular zone, and the second transition zone being connected between the first annular zone and the second annular zone, and the second transition zone and the first transition zone being aligned in the radial direction of the base portion. A plurality of second transition zones are provided and arranged by equal intervals in the circumferential direction of the base portion, and the first through-hole is formed between two adjacent second transition zones. A wall of first annular zone facing the second annular zone is connected to the bending zone.

In some embodiments, in the radial direction of the base portion, a width of the first annular zone is greater than or equal to a width of the connecting zone, which can ensure the strength of the first annular zone to reduce the risk of the first annular zone being apt to deform and tear.

In some embodiments, the current collector member comprises a plurality of second through-holes, the elastic portion comprises a plurality of the bending zones, and the plurality of the second through-holes and the plurality of bending zones are alternately arranged in the circumferential direction of the base portion; and the connecting zone is connected to the plurality of the bending zones.

In the above solutions, the strength of each bending zone can be reduced by arranging multiple second through-holes, so that each bending zone may deform more easily. When the connecting zone abuts against an electrode component and squeezed by the electrode component, a pressure may be transmitted to multiple bending zones, and under the action of the pressure, the bending zone may deform to release the pressure between the connecting zone and the electrode component, reducing the risk of crushing the electrode component due to excessive pressure. The bending zone produces an elastic force after compression deformation, and under the action of the elastic force, the connecting zone is kept in contact with the electrode component, reducing the contact resistance between the electrode component and the connecting zone to improve the overcurrent capacity.

In some embodiments, a thickness of the bending zone is less than a thickness of the base portion; and/or a thickness of the connecting zone is less than the thickness of the base portion. On the premise of satisfying the stiffness requirements, the appropriate thinning of the bending zone and/or the connecting zone can achieve that an elastic portion may deform more easily to better fit into an electrode component when it is squeezed by the electrode component.

In some embodiments, a roughness of a surface of the connecting zone facing the electrode component is greater than a surface roughness of the base portion. By increasing the surface roughness of the connecting zone, the contact resistance between the connecting zone and the electrode component can be reduced to improve the overcurrent capacity.

In some embodiments, the electrode component has a first surface facing the end cap and a first concave portion recessed with respect to the first surface, and at least a part of the elastic portion is accommodated in the first concave portion.

In some embodiments, the first surface is in contact with the base portion to increase the contact area between a current collector member and an electrode component so as to improve the overcurrent capacity.

In some embodiments, the end cap has a second surface facing the electrode component and a second concave portion recessed with respect to the second surface, and at least a part of the base portion is accommodated in the second concave portion. By arranging the second concave portion, the space occupied by the end cap and a current collector member can be reduced to improve the energy density of a battery. In the process of assembling a battery cell, the end cap and the current collector member can be preassembled together, and then assembled with the electrode component. The arrangement of the second concave portion can further facilitate the positioning of the current collector member, which is helpful to simplify the assembly process of the end cap and the current collector member.

In some embodiments, the base portion is welded to the end cap; and/or the base portion is in interference fit into the second concave portion.

In some embodiments, the elastic portion abuts against the electrode component via a conductive medium. By arranging a conductive medium with good conductivity, a stable current can be output better.

In some embodiments, the electrode component includes a main body and a tab portion extending from the main body, and the tab portion being located between the main body and the end cap. The current collector member further comprises a first extension component, the first extension component extending from an edge of the base portion in a direction close to the main body, and the first extension component surrounding an outer side of the tab portion. The first extension component and the base portion form a third concave portion, a part of the tab portion extending into the third concave portion, and at least a part of the elastic portion being accommodated in the third concave portion and abutting the tab portion. The first extension component can be used to close up the tab portion.

According to a second aspect, the embodiments of The present disclosure further provide a battery including at least one battery cell in any embodiment according to the first aspect.

According to a third aspect, the embodiments of The present disclosure further provide an electrical device including a battery in any embodiment according to the second aspect, the battery is used to provide electricity.

According to a fourth aspect, the embodiments of The present disclosure further provide a manufacturing method for a battery cell including providing an end cap; providing a current collector member comprising a base portion and an elastic portion connected to the base portion; connecting the base portion to the end cap; providing an electrode component; providing a casing having an opening; putting the electrode component into the casing via the opening; and connecting the end cap connected with the current collector member to the casing, to seal the opening of the casing, so that the current collector member electrically connects the electrode component and the end cap, wherein the base portion and the elastic portion are located between the end cap and the electrode component, at least a part of the elastic portion protrudes from a surface of the base portion facing the electrode component and abutting the electrode component, and the elastic portion is configured to be able to deform when squeezed by the electrode component.

According to a fifth aspect, the embodiments of the present disclosure further provide a manufacturing system for a battery cell including a first providing means for providing an end cap; a second providing means for providing a current collector member, the current collector member comprising a base portion and an elastic portion connected with the base portion; a first assembly device for connecting the base portion to the end cap; a third providing means for providing an electrode component; a fourth providing means for providing a casing having an opening; a second assembly device for putting the electrode component into the casing via the opening; a third assembly device for connecting the end cap connected to the current collector member to the casing, to seal the opening of the casing, so that the current collector member electrically connects the electrode component and the end cap, wherein the base portion and the elastic portion are located between the end cap and the electrode component, at least a part of the elastic portion protrudes from a surface the base portion facing the electrode component and abuts against the electrode component, and the elastic portion is configured to be able to deform when squeezed by the electrode component.

BRIEF DESCRIPTION OF DRAWINGS

To describe the technical solutions in the embodiments of The present disclosure more clearly, the following outlines the drawings used in the embodiments of The present disclosure. Evidently, the drawings outlined below are merely some embodiments of the present disclosure. A person of ordinary skill in the art can derive other drawings from the outlined drawings without making any creative efforts.

FIG. 15 is a structural schematic diagram for a current collector member of a battery cell provided in some further embodiments of The present disclosure;

FIG. 16 is a flow schematic diagram for a manufacturing method of a battery cell provided in some embodiments of The present disclosure;

DETAILED DESCRIPTION OF EMBODIMENTS

Figure 1:
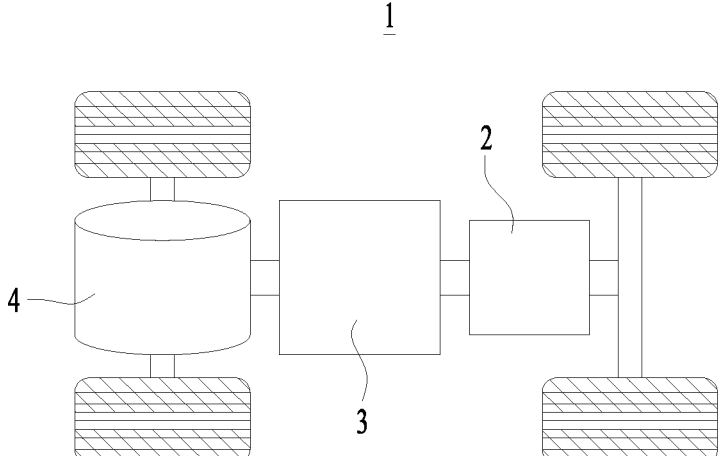
FIG. 1 is a structural schematic diagram of a vehicle provided in some embodiments of the present disclosure.

To make the purpose, technical solutions and advantages of the embodiments of The present disclosure more clearly, the technical solutions of the embodiments of The present disclosure may be clearly described in combination with the drawings of the embodiments of The present disclosure. Evidently, the described embodiments are simply some embodiments of The present disclosure, but are not all embodiments of The present disclosure. Based on the embodiments of The present disclosure, all other embodiments obtained by a person of ordinary skill in the art without creative efforts fall within the scope of The present disclosure.

Unless otherwise defined, all technical and scientific terms used herein have the same meaning as those normally understood by a person of skill in the art of The present disclosure. The terms used herein are for the purpose of describing specific embodiments and are not intended to limit The present disclosure. The terms "comprise" and "have" and any variations thereof in the description, claims and said drawings of The present disclosure are intended to cover a non-exclusive inclusion. The terms such as "first" and "second" in the description, claims and said drawings of The present disclosure are simply used to distinguish different objects, rather than to describe a specific order or a primary & secondary relation.

The "embodiment" referred herein means at least one embodiment that can be included in The present disclosure with reference to the specific characteristics, structures or features described in the embodiment. The phrase at various positions in the description neither does necessarily refer to the same embodiment, nor are they independent or alternative embodiments mutually exclusive with other embodiments.

Please note that, in the description of The present disclosure, unless otherwise expressly specified and defined, the terms such as "install", "concatenate", "connect" and "attach" are understood in a broad sense. For example, a "connection" may be a fixed connection, a detachable connection, or an integrated connection; a direct connection, or an indirect connection implemented through an intermediary, and may be an internal conduct of two components. A person of ordinary skill in the art can understand the specific meanings of the terms in The present disclosure according to specific situations.

The term "and/or" in The present disclosure simply describes the association relation of the associated objects, indicating that there can be three relations, such as A and/or B, indicating that A exists alone, A and B exist simultaneously, and B exists alone. In addition, the character "I" herein generally indicates a "or" relation between associated objects.

In various embodiments herein, the same drawing reference numeral means the same component, and for the sake of brevity, the detailed description of the same components has been omitted in different embodiments. Understandably, the dimensions of thickness, length and width of various components and the overall thickness, length and width of the integrated device in the embodiments of The present disclosure as shown in the drawings are simply an exemplary description, rather than constituting any limitation of The present disclosure.

In the present disclosure, the term "multiple" means more than two (including two).

In the present disclosure, a battery cell may comprise a lithium ion secondary battery cell, a lithium ion primary battery cell, a lithium sulfur battery cell, a sodium lithium ion battery cell, a sodium ion battery cell, or a magnesium ion battery cell, which is not limited in this regard in the embodiments of The present disclosure. The battery cell can be in cylindrical, flat, rectangular or other shapes, which is not limited in this regard in the embodiments of The present disclosure. Generally, the battery cell can be divided into three types by the encapsulating method: cylindrical battery cell, square battery cell, and soft encapsulating battery cell, which is not limited in this regard in the embodiments of The present disclosure.

The battery referred to in the embodiments of The present disclosure means a single physical module comprising one or more battery cell(s) to provide a higher voltage and capacity. For example, the battery referred to in The present disclosure may comprise a battery module or a battery pack. A battery generally comprises a box for encapsulating one or more battery cell(s). The box can prevent liquid or foreign matter from affecting battery charging or discharging.

A battery cell comprises an electrode component and an electrolyte. The electrode component is composed of a positive electrode piece, a negative electrode piece and an isolation film. The battery cell works by moving metal ions between the positive electrode piece and the negative electrode piece. The positive electrode piece comprises a positive current collector and a positive active material layer. The positive active material layer is coated on the surface of the positive current collector, and the positive current collector uncoated with the positive material layer protrudes from the positive current collector coated with the positive material layer, while the positive current collector uncoated with the positive material layer is used as a positive tab. Take lithium-ion battery as an example, the material of positive current collector can be aluminum, and the positive active material can be lithium cobalt acid, lithium iron phosphate, ternary lithium or lithium manganese acid, etc. The negative electrode piece comprises a negative current collector and a negative active material layer. The negative active material layer is coated on the surface of the negative current collector, and the negative current collector uncoated with negative active material layer protrudes from the negative current collector coated with negative active material layer, while the negative current collector uncoated with the negative active material layer is used as a negative tab. The material of the negative current collector can be copper, and the negative active material can be carbon or silicon, etc. To ensure no fusing under a high current, the number of positive tabs is multiple and is laminated together, and the number of negative tabs is also multiple and is laminated together. The material of isolation film can be PP (polypropylene) or PE (polyethylene), etc. In addition, the electrode component may be either a winding or a laminating structure, which is not limited in this regard in the embodiments of The present disclosure.

A battery cell further comprises a casing, and the casing is used to accommodate an electrode component and an electrolyte. The casing comprises a casing and an end cap connected with the casing, and the casing and the end cap form an accommodation cavity to accommodate the electrode component and the electrolyte. In a common battery cell, the electrode component is electrically connected the end cap or the electrode terminals arranged on the end cap through a current collector member, and the current collector member is usually welded to the electrode component. The inventor(s) finds that metal particles may generate during the welding, and the residual metal particles in the battery cell may cause the risk of short circuit.

Given that, the embodiments of The present disclosure provide a technical solution, and a battery cell comprises: an electrode component; a casing, which is used to accommodate an electrode component and has an opening; an end cap, which is used to close the opening of the casing; a current collector member, which is used to electrically connect the electrode component and the end cap, comprising a base portion and an elastic portion connected with the base portion, the base portion and the elastic portion are located between the end cap and the electrode component, the base portion is used to connect to the end cap, the elastic portion at least partially protrudes from a surface of the base portion facing the electrode component and abuts against the electrode component, and the elastic portion is configured to be able to deform when squeezed by the electrode component. A battery cell with this structure is not required to weld the electrode component and the current collector member, so the residual metal particles in the battery cell are reduced to lower the safety risks.

The technical solutions described in various embodiments are applicable to a battery and an electrical device using the battery.

The electrical device can be a vehicle, a mobile phone, a portable device, a laptop computer, a ship, a spacecraft, an electric toy and an electric tool, etc. The vehicle can be a fuel vehicle, a gas vehicle or a new energy vehicle, and the new energy vehicle can be a pure electric vehicle, a hybrid vehicle or an extended range vehicle, etc.; the spacecraft comprises an aircraft, a rocket, a space shuttle and a spaceship, etc.; the electric toy comprises a fixed or mobile electric toy, such as a game console, an electric car toy, an electric ship toy and an electric aircraft toy, etc.; the electric tool comprises a metal cutting electric tool, a grinding electric tool, an assembly electric tool and a railway electric tool, such as an electric drill, an electric grinder, an electric wrench, an electric screwdriver, an electric hammer, an electric impact drill, a concrete vibrator and an electric planer, etc. There is no special limitation on the above electrical devices in the embodiment of The present disclosure.

For convenience of description, the following embodiments are described with a vehicle as the electrical device.

FIG. 1 is a structural schematic diagram of a vehicle 1 provided in some embodiments of The present disclosure. As shown in FIG. 1, the interior of the vehicle 1 is provided with a battery 2, and the battery 2 can be arranged at the bottom, head or tail of the vehicle 1. The battery 2 can be used to power the vehicle 1. For example, the battery 2 can be used as the operating power supply for the vehicle 1.

The vehicle 1 may further comprise a controller 3 and a motor 4, and the controller 3 is used to control the battery 2 to supply power to the motor 4, for example, for the operating electricity demands of the vehicle 1 in start, navigation and driving.

In some embodiments of The present disclosure, the battery 2 not only can be used as the operating power supply of the vehicle 1, but also as the driving power supply of the vehicle 1, which substitutes or partially substitutes fuel or natural gas to provide driving power for the vehicle 1.

Figure 2:
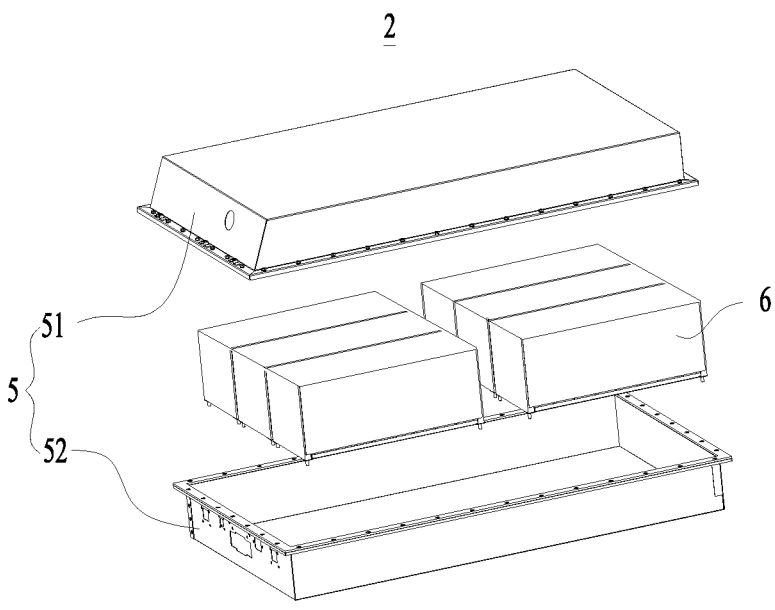
FIG. 2 is an exploded view of a battery provided in some embodiments of The present disclosure.

FIG. 2 is an exploded view of a battery 2 provided in some embodiments of The present disclosure. As shown in FIG. 2, the battery 2 comprises a box 5 and a battery cell (not shown in FIG. 2), and the battery cell is accommodated in the box 5.

The box 5 is used to accommodate a battery cell, and the box 5 can be in various structures. In some embodiments, a box 5 may comprise a first box component 51 and a second box component 52. The first box component 51 and the second box component 52 fit each other, and the first box component 51 and the second box component 52 jointly define the accommodation space for the battery cell. The second box component 52 can be a hollow structure with an opening at one end. The first box component 51 is a plate-like structure. The first box component 51 is fitted into the opening side of the second box component 52 to form a box 5 that has an accommodation space. The first box component 51 and the second box component 52 may further both be a hollow structure with an opening on one side, and the opening side of the first box component 51 is fitted into the opening side of the second box component 52 to form a box 5 that has an accommodation space. Of course, the first box component 51 and the second box component 52 can be in various shapes, such as cylinder and cuboid.

To improve the sealing performance of the connection between the first box component 51 and the second box component 52, the sealing elements such as sealant and sealing ring can be arranged between the first box component 51 and the second box component 52.

Assuming that the first box component 51 is fitted into the top of the second box component 52, then the first box component 51 may also be called the upper box cover and the second box component 52 may further be called the lower box.

In the battery 2, there can be one or multiple battery cell(s). When there are multiple battery cells, they can be connected in series, in parallel or in mixed, and the mixed connection means there is both connections in series and in parallel in the multiple battery cells. Multiple battery cells can be directly connected in series, in parallel or in mixed, and then a whole composed of multiple battery cells is accommodated in the box 5. Of course, multiple battery cells can be connected in series, in parallel or in mixed to form a battery module 6, and then multiple battery modules 6 can be connected in series, in parallel or in mixed to form a whole that is accommodated in the box 5.

Figure 3:
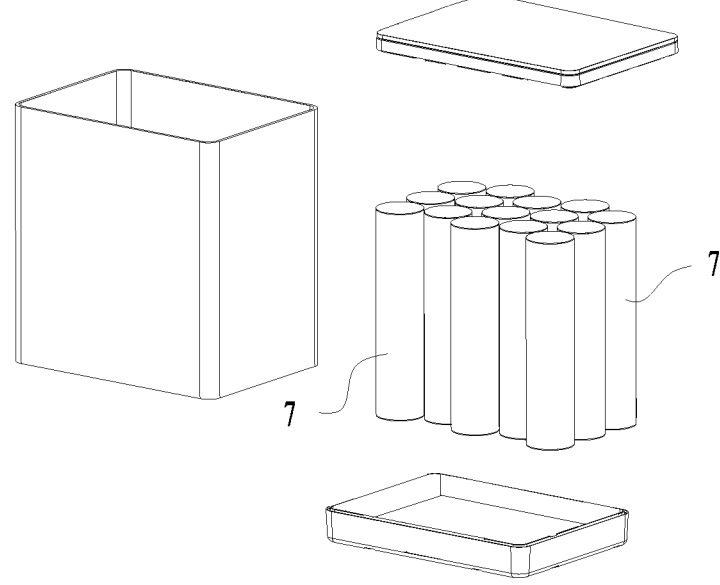
FIG. 3 is a structural schematic diagram of a battery module as shown in FIG. 2.

FIG. 3 is a structural schematic diagram of a battery module 6 as shown in FIG. 2. In some embodiments, as shown in FIG. 3, there are multiple battery cells 7, which form a battery module 6 connected in series, in parallel or in mixed. Multiple battery modules 6 are connected in series, in parallel, or in mixed to form a whole that is accommodated in the box 5.

Multiple battery cells 7 in the battery module 6 can be electrically connected through a current collector component to achieve that multiple battery cells 7 are connected in series, in parallel or in mixed in the battery module 6.

Figure 4:
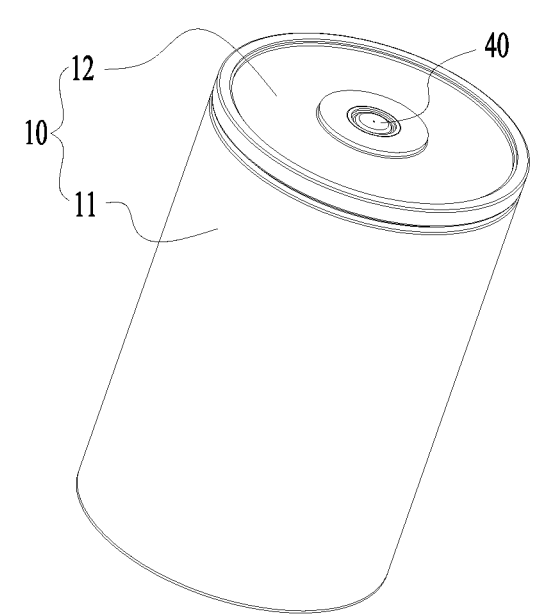
FIG. 4 is a structural schematic diagram of a battery cell as shown in FIG. 3.
Figure 5:
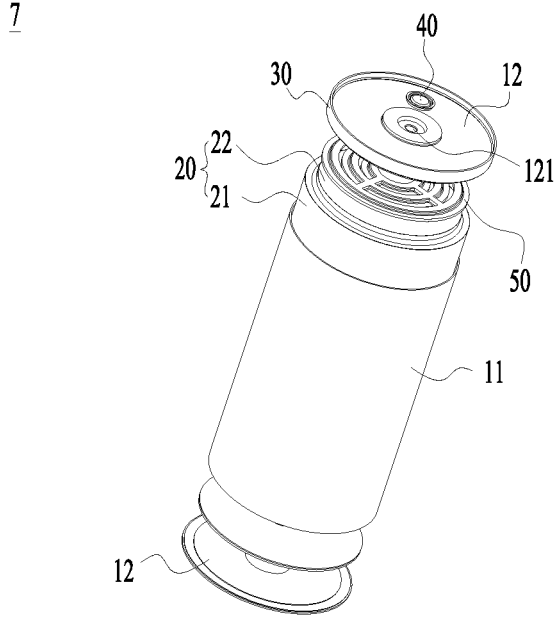
FIG. 5 is an exploded view of a battery cell provided in some embodiments of The present disclosure.

FIG. 4 is a structural schematic diagram of a battery cell 7 as shown in FIG. 3, and FIG. 5 is an exploded view of a battery cell 7 provided in some embodiments of The present disclosure. As shown in FIG. 4 and FIG. 5, the battery cell 7 provided in the embodiments of The present disclosure comprises a casing 10 and an electrode component 20, and the electrode component 20 is accommodated in the casing 10.

According to the appearance of the electrode component 20, the electrode component 20 comprises a main body 21 and a tab portion 22 extending from the main body 21. In some embodiments, there are two tab portions 22, which extend from one end of the main body 21, respectively. The main body 21 comprises a positive active material layer, a portion of a positive current collector coated with the positive active material layer, a negative active material layer, a portion of a negative current collector coated with the negative active material layer, and an isolation film. The two tab portions 22 are positive tab and negative tab, respectively. In some embodiments, an electrode component 20 is a winding structure, and correspondingly, each tab portion 22 is winded into a multilayer structure.

In some embodiments, a casing 10 may further be used to accommodate an electrolytic material, such as electrolyte. The casing 10 can be in various structural forms.

In some embodiments, a casing 10 may comprise a casing 11 and an end cap 12, and the casing 11 is a hollow structure with an opening, and the end cap 12 fits into the opening of the casing 11 to constitute a sealed connection, forming a sealed space for accommodating an electrode component 20 and an electrolyte.

The casing 11 can be in various shapes, such as cylinder and cuboid. The shape of the casing 11 is subject to the specific shape of the electrode component 20. For example, when the electrode component 20 is a cylindrical structure, a cylindrical casing can be selected; when the electrode component 20 is a cuboid structure, then a cuboid casing can be selected. Of course, the end cap 12 can also be in various structures, for example, the end cap 12 is a plate-like structure or a hollow structure with an opening at one end. Exemplarily, in FIG. 4 and FIG. 5, the casing 11 is a cylindrical structure, the end cap 12 is a plate-like structure, and the end cap 12 fits into the opening of the casing 11.

In some embodiments, a battery cell 7 further comprises a sealing member 30, and the sealing member 30 separates an end cap 12 from a casing 11. The sealing member 30 seals the opening of the casing 11 to improve the sealing performance of the battery cell 7. The material of the sealing member 30 can be PP, PE, PFA or fluorine rubber. In some embodiments, a sealing member 30 is made of an insulating material, which can insulate the end cap 12 from the casing 11.

In some embodiments, a casing 10 comprises a casing 11 and two end caps 12. The casing 11 is a hollow structure with openings at opposite sides, and each end cap 12 fits into a corresponding opening of the casing 11 to constitute a sealed connection, forming a sealed space for accommodating an electrode component 20 and an electrolyte. In some embodiments, one end cap 12 may be directly connected to a casing 11, for example, welded to the casing 11, and a sealing member 30 insulates the other end cap 12 from the casing 11. In some embodiments, a tab portion 22 is located between a main body 21 and an end cap 12, and another tab portion 22 is located between the main body 21 and another end cap 12. The two end caps 12 are electrically connected the two tab portions 22, respectively. The two end caps 12 can be used as the positive and negative electrode terminals of a battery cell 7 respectively to output the electricity generated by an electrode module 20.

In other embodiments, a casing 10 comprises a casing 11 and an end cap 12. The casing 11 is a hollow structure with an opening on one side, and end cap 12 fits into the opening of the casing 11 to form a sealed connection. In some embodiments, a tab portion 22 is located between a main body 21 and an end cap 12, and another tab portion 22 is located between the main body 21 and the base plate of the casing 11. The end caps 12 and the casing 11 are electrically connected the two tab portions 22, respectively. The end cap 12 and the casing 11 can be used as the positive and negative electrode terminals of a battery cell 7 respectively to output the electricity generated by the electrode module 20.

In some embodiments, at least one end cap 12 is provided with an electrolyte injection hole 121, and the electrolyte injection hole 121 passes through the end cap 12 along the thickness direction of the end cap 12. In the liquid injection process of a battery cell 7, the electrolyte enters the battery cell 7 through the electrolyte injection hole 121. The battery cell 7 further comprises a sealing plate 40. The sealing plate 40 is connected to the end cap 12, and covers the electrolyte injection hole 121 to seal the electrolyte injection hole 121 after the liquid injection process is completed.

In some embodiments, a battery cell 7 further comprises a current collector member 50, and the current collector member 50 is used to electrically connect an electrode component 20 and an end cap 12. The current collector member 50 can transmit the current between the electrode component 20 and the end cap 12. In some embodiments, a current collector member 50 is a metal sheet, such as a nickel sheet.

In some embodiments, a battery cell 7 is cylindrical and a current collector member 50 is roughly disc-shaped.

In some embodiments, a current collector member 50 abuts against an electrode component 20. When assembling a battery cell 7, an end cap 12 squeezes the current collector member 50, and the current collector member 50 abuts against the electrode component 20, so that the current collector member 50 is kept in contact with the end cap 12 and the electrode component 20, and the current transmission between the electrode component 20 and the end cap 12 is achieved. In this embodiment, the abuts against the electrode component 20, so the current collector member 50 is not required to be welded to the electrode component 20, thus reducing the residual metal particles in the battery cell 7 to lower the risk of short circuit.

However, the inventor(s) finds that the pressure between a current collector member and an electrode component is hard to be controlled. When the pressure is over-large, the current collector member is apt to crush the electrode component, especially when a battery cell vibrates. When the pressure is over-small, the contact resistance between them is over-large, resulting in an inadequate overcurrent capacity.

Based on the above problem found by the inventor(s), the inventor(s) improves the structure of a battery cell, which is described in details in combination with different embodiments below.

Figure 6:
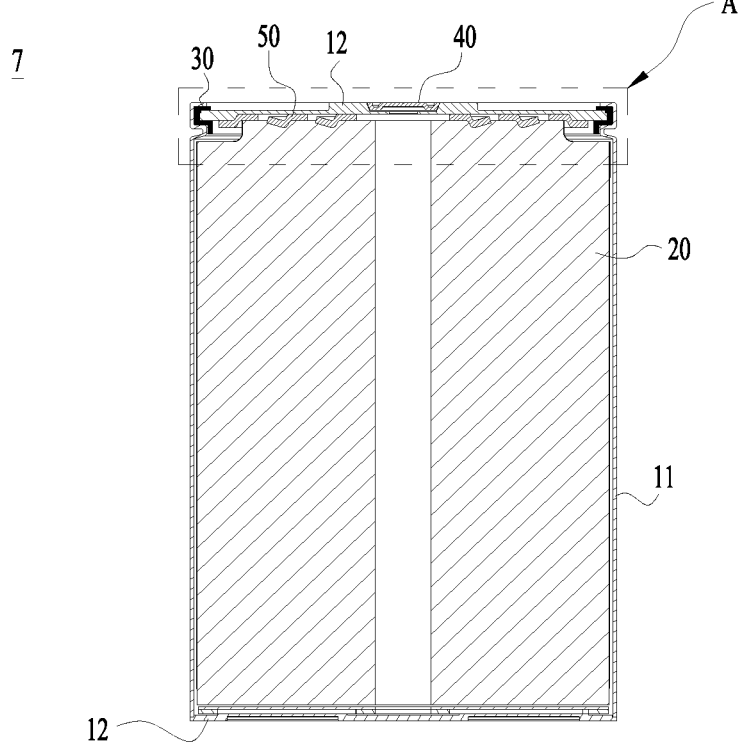
FIG. 6 is a section view of a battery cell provided in some embodiments of The present disclosure.
Figure 7:
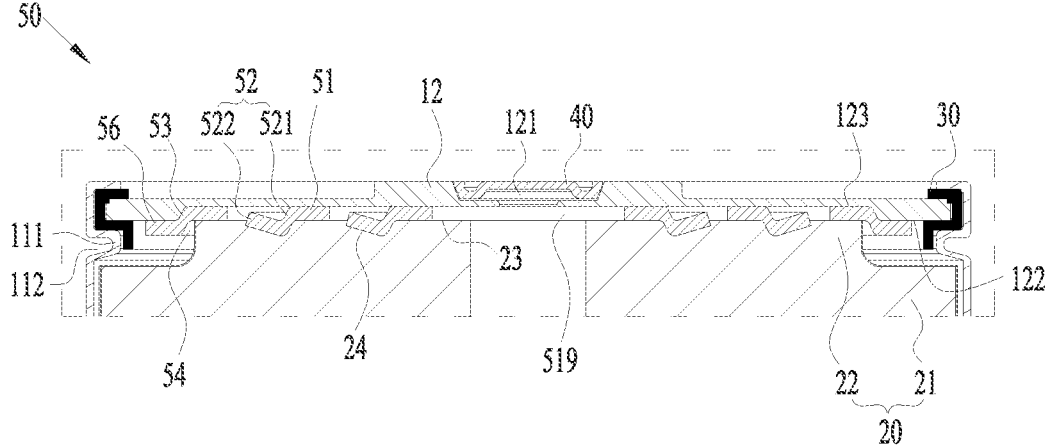
FIG. 7 is an enlarged schematic diagram in box A of a battery cell as shown in FIG. 6.

FIG. 6 is a section view of a battery cell 7 provided in some embodiments of The present disclosure. FIG. 7 is an enlarged schematic diagram at box A of a battery cell 7 as shown in FIG. 6.

As shown in FIG. 6 and FIG. 7, in a battery cell 7 of the embodiments of The present disclosure, a current collector member 50 comprises a base portion 51 and an elastic portion 52 connected with the base portion 51. The base portion 51 and the elastic portion 52 are located between an end cap 12 and an electrode component 20, and the base portion 51 is used to connect the end cap 12. The elastic portion 52 at least partially protrudes from a surface of the base portion 51 facing the electrode component 20 and abuts against the electrode component 20. The elastic portion 52 is configured to be able to deform when squeezed by the electrode component 20.

The base portion 51 is connected to the end cap 12. In some examples, a base portion 51 can be connected to an end cap 12 by clamping, interference fit, welding, or other means.

In some embodiments, a base portion 51 is roughly a flat-plate-shape. Two surfaces oppositely arranged in the own thickness direction of the base portion 51 are flat, and face an end cap 12 and an electrode component 20, respectively.

An elastic portion 52 at least partially protrudes from a surface of the base portion 51 facing the electrode component 20. During the assembly, the end cap 12 is inserted into a casing 11 and is pushed towards the electrode component 20. A current collector member 50 moves along the end cap 12 towards the electrode component 20. The elastic portion 52 first contacts the electrode component 20 and then gradually squeezes the electrode component 20. The elastic portion 52 may deform under the reaction force applied by the electrode component 20 to release the pressure between them.

In a battery cell 7 of The present disclosure, an elastic portion 52 abuts against an electrode component 20 and is able to deform when squeezed by the electrode component 20, and the pressure between them is released through deformation, reducing the risk of crushing the electrode component 20 due to excessive pressure. The elastic portion 52 produces an elastic force after compression deformation, and under the action of elastic force, the elastic portion 52 is kept in contact with the electrode component 20, reducing the contact resistance between the electrode component 20 and the elastic portion 52 to improve the overcurrent capacity.

In some embodiments, an electrode component 20 has a first surface 23 facing an end cap 12 and a first concave portion 24 concaved against the first surface 23, and an elastic portion 52 at least partially is accommodated in the first concave portion 24. The elastic portion 52 abuts against a tab portion 22, and the surface of the tab portion 22 away from a main body 21 is the first surface 23. In the winding-type electrode component 20, the tab portion 22 comprises a metal foil winded in multiple turns (such as aluminum foil or copper foil), and the metal foil is soft and easily deformed, so the tab portion 22 may form a first concave portion 24 when squeezed by the elastic portion 52.

In some embodiments, a first surface 23 is kept in contact with a base portion 51 to increase the contact area between a current collector member 50 and an electrode component 20 so as to improve the overcurrent capacity. In other embodiments, a first surface 23 may also be arranged against a base portion 51 by interval, provided that the contact area between an elastic portion 52 and the electrode component 20 satisfies the requirements.

In some embodiments, an end cap 12 has a second surface 122 facing an electrode component 20 and a second concave portion 123 concaved to a second surface 122, and a base portion 51 at least partially is accommodated in the second concave portion 123. The second concave portion 123 is concaved against the second surface 122 in the direction away from the electrode component 20. In some examples, a second surface 122 is flat.

By arranging the second concave portion 123, the space occupied by the end cap 12 and a current collector member 50 can be reduced, so the energy density of a battery cell 7 can be improved. In addition, during the assembly of the battery cell 7, the end cap 12 and the current collector member 50 can be preassembled, and then assembled with the electrode component 20. The arrangement of the second concave portion 123 can also facilitate the positioning of the current collector member 50, which is helpful to simplify the assembly process of the end cap 12 and the current collector member 50.

In some embodiments, a base portion 51 of a current collector member 50 is connected to an end cap 12. The connection mode between the base portion 51 and the end cap 12 can be selected as required.

In some examples, a base portion 51 is in interference fit into a second concave portion 123, so that the base portion 51 is clamped with an end cap 12. This assembly mode is not apt to generate metal particles.

In other examples, a base portion 51 is welded to an end cap 12, and during the welding, the laser can be applied on the side of the end cap 12 away from the base portion 51, reducing the risk that the metal particles generated from welding enter a battery cell 7.

In other examples, a base portion 51 is in interference fit into a second concave portion 123, and the base portion 51 is welded to an end cap 12, improving the overcurrent capacity between the base portion 51 and the end cap 12. In addition, in The present disclosure, the end cap 12 and the base portion 51 can be welded when assembling the end cap 12 and a current collector member 50, or the end cap 12 and the base portion 51 can be welded from the outer side after assembling the end cap 12 and a casing 11.

In other further examples, a base portion 51 may also be bonded to an end cap 12 by a conductive adhesive.

In some embodiments, an elastic portion 52 abuts against an electrode component 20 through a conductive medium. By arranging a conductive medium with good conductivity, a stable current can be output better. In some examples, the conducting medium may be a conductive adhesive, a silver, or other materials.

In some embodiments, a current collector member 50 further comprises a first extension component 53, and the first extension component extends from the edge of a base portion 51 towards a main body 21. In some embodiments, a base portion 51 is roughly a circular flat-plate, and the base portion 51 has a circular edge. A first extension 53 is connected to the edge of the base portion 51 and is arranged around the base portion 51, and the first extension 53 is bent against the base portion 51.

In some embodiments, a first extension component 53 surrounds the outer side of a tab portion 22. The first extension component 53 and a base portion 51 form a third concave portion 54. A portion of the tab portion 22 extends into the third concave portion 54, and an elastic portion 52 at least partially is accommodated in the third concave portion 54 and abuts against the tab portion 22. The tab portion 22 comprises a metal foil winded in multiple turns, and the first extension 53 can close up the tab portion 22.

In some embodiments, a current collector member 50 further comprises a second extension component 56, and the second extension component is connected to one end of a first extension 53 away from a base portion 51. In some embodiments, a second extension component 56 is circular and roughly parallel to a base portion 51. In some embodiments, a second extension component 56 can serve as a connecting zone between a current collector member 50 and an end cap 12.

In some embodiments, a casing 11 has an inwards convex component 111, and the convex component 111 is located on a side of an end cap 12 facing a main body 21 to support the end cap 12. In some embodiments, a convex component 111 can be formed by rolling a casing 11, and a groove 112 is formed on the outer side of the convex component 111.

Figure 8:
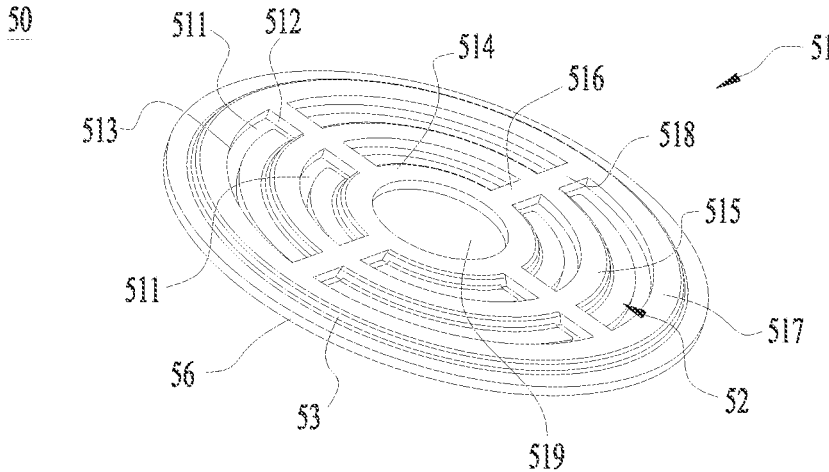
FIG. 8 is a structural schematic diagram for a current collector member of a battery cell provided in some embodiments of The present disclosure.
Figure 9:
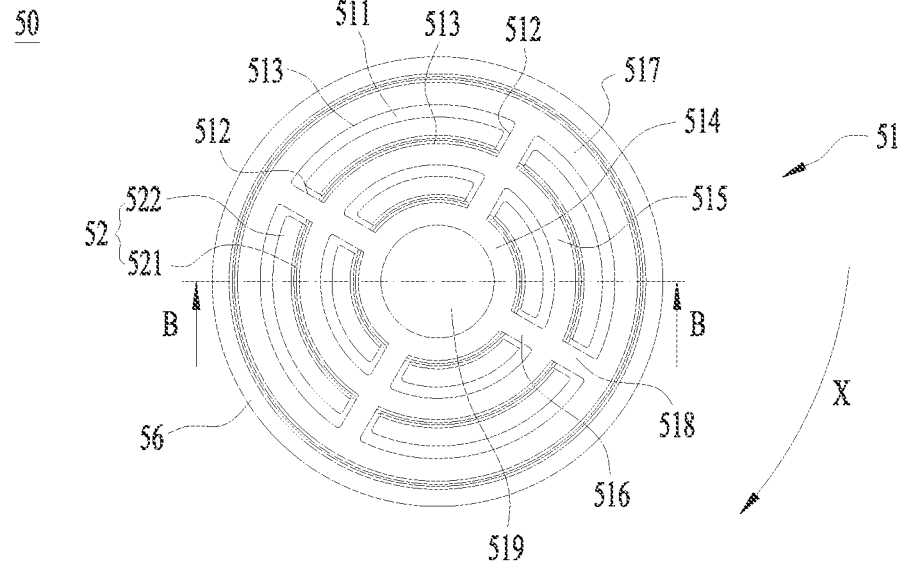
FIG. 9 is a top view of a current collector member as shown in FIG. 8.
Figure 10:
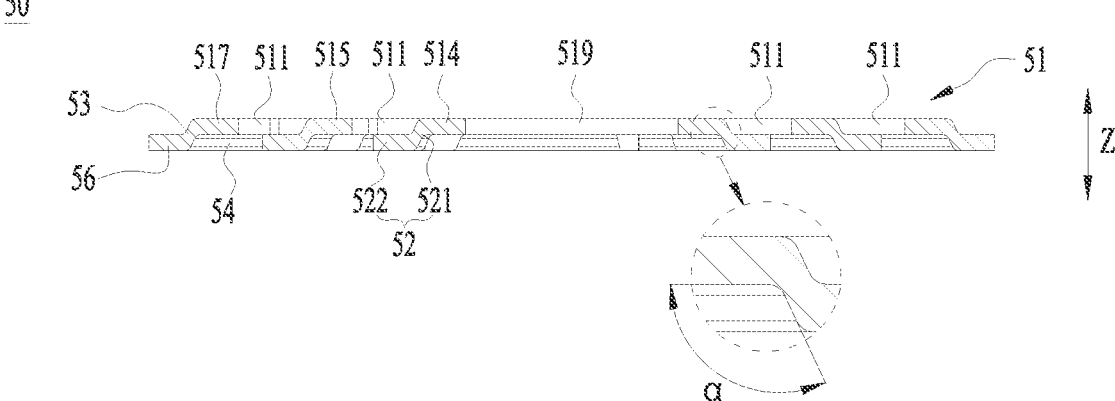
FIG. 10 is a section view of the current collector member as shown in FIG. 9 taken along a line B-B.

FIG. 8 is a structural schematic diagram for a current collector component 50 of a battery cell 7 provided in some embodiments of The present disclosure; FIG. 9 is a top view of a current collector member 50 as shown in FIG. 8. FIG. 10 is a section view of a current collector member 50 as shown in FIG. 9 taken along a line B-B.

Please also refer FIG. 7 through FIG. 10. In some embodiments, an elastic portion 52 comprises a bending zone 521 and a connecting zone 522. One end of the bending zone 521 is connected to a base portion 51 and is bent towards an electrode component 20, and the connecting zone 522 is connected to the other end of the bending zone 521 and abuts against the electrode component 20. The bending zone 521 is bent at a preset angle against the base portion 51 so as to be close to the electrode component 20. In some embodiments, both a bending zone 521 and a connecting zone 522 are kept in contact with a tab portion 22 of an electrode component 20.

In some embodiments, before an elastic portion 52 is deformed under compression, a connecting zone 522 is roughly parallel to a base portion 51, and the angle between the connecting zone 522 and a bending zone 521 is equal to the angle between the base portion 51 and the bending zone 521. During the assembly, the connecting zone 522 can rotate against the bending zone 521 with a joint between the connecting zone 522 and the bending zone 521 as the axis, while the angle between the connecting zone 522 and the bending zone 521 changes; similarly, the bending zone 521 can rotate against the base portion 51 with a joint between the bending zone 521 and the base portion 51 as the axis, while the angle between the base portion 51 and the bending zone 521 changes. In a battery cell 7, one end of the connecting zone 522 away from the bending zone 521 is closer to an end cap 12 than one end of the connecting zone 522 near the bending zone 521.

In a battery cell 7 of the embodiments of The present disclosure, when an elastic portion 52 abuts against an electrode component 20 and is squeezed by the electrode component 20, both a connecting zone 522 and a bending zone 521 may deform to release the pressure between the electrode component 20 and the elastic portion 52, reducing the risk of crushing the electrode component 20 due to excessive pressure. The connecting zone 522 and the bending zone 521 produce an elastic force after compression deformation, and under the action of the elastic force, the connecting zone 522 is kept in contact with the electrode component 20, reducing the contact resistance between the electrode component 20 and the elastic portion 52 to improve the overcurrent capacity.

In the present disclosure, the elasticity of an elastic portion 52 can be improved by reducing its stiffness, so that the elastic portion 52 may deform more easily. For example, in The present disclosure, the stiffness of the elastic portion 52 can be reduced by changing the material of the elastic portion 52, by reducing the thickness of the elastic portion 52, or by other means.

In some examples, the thickness of a bending zone 521 is less than that of a base portion 51. On the premise of satisfying the stiffness requirements, the appropriate thinning of the bending zone 521 can achieve that the bending zone 521 may rotate against the base portion 51 more easily. When squeezed by an electrode component 20, an elastic portion 52 may deform more easily to better fit into a tab portion 22. Exemplarily, the thickness of the bending zone 521 is 0.2 mm to 0.4 mm.

In other examples, the thickness of a connecting zone 522 is less than that of a base portion 51. On the premise of satisfying the stiffness requirements, the appropriate thinning of the connecting zone 522 can achieve that the connecting zone 522 may rotate against a bending zone 521 more easily. When squeezed by an electrode component 20, an elastic portion 52 may deform more easily to better fit into a tab portion 22. Exemplarily, the thickness of the connecting zone 522 is 0.2 mm to 0.4 mm.

In other further examples, the thickness of a bending zone 521 is less than that of a base portion 51, and the thickness of a connecting zone 522 is less than that of the base portion 51. Exemplarily, the thickness of the bending zone 521 is equal to that of the connecting zone 522. The thickness of the bending zone 521 is 0.2 mm to 0.4 mm, and the thickness of the connecting zone 522 is 0.2 mm to 0.4 mm.

In some embodiments, the roughness of a surface of a connecting zone 522 facing an electrode component 20 is greater than the surface roughness of a base portion 51. By increasing the surface roughness of the connecting zone 522, the contact resistance between the connecting zone 522 and a tab portion 22 can be further reduced to improve the overcurrent capacity. In some embodiments, the roughness of a surface of a connecting zone 522 facing an electrode component 20 is approximately the same as that of a surface of a bending zone 521 facing the electrode component 20. In some examples, an embossing is used to increase the surface roughness of a connecting zone 522 and a bending zone 521.

In some embodiments, a current collector member 50 is an integral structure. Exemplarily, the current collector member 50 is formed by machining a metal plate.

In some embodiments, a base portion 51 comprises a first through-hole 511, and one end of a bending zone 521 is connected to the wall of the first through-hole 511. A portion of the wall of the first through-hole 511 is integrated with the bending zone 521. In the forming process of a current collector member 50, the bending zone 521 and a connecting zone 522 can be formed when punching the first through-hole 511. For example, the current collector member 50 is formed by punching a metal plate, and a portion of the metal plate originally located in the first through-hole 511 is used to form an elastic portion 52.

In some embodiments, in the thickness direction Z of a base portion 51, the projection of a connecting zone 522 is within the projection of a first through-hole 511. When squeezed by an electrode component 20, the connecting zone 522 may move towards the first through-hole 511, that is, the first through-hole 511 can reserve some deformation space for the connecting zone 522, and the base portion 51 may not impede the deformation of the connecting zone 522.

In some embodiments, in the thickness direction Z of a base portion 51, the projection of a bending zone 521 is also within the projection of a first through-hole 511.

In some embodiments, before an elastic portion 52 is deformed under compression, the angle α between a bending zone 521 and a base portion 51 is greater than 90 degrees. Thus, when the force is applied on one end of the bending zone 521 away from the base portion 51, the angle α tends to increase, and one end of the bending zone 521 away from the base portion 51 may move toward a first through-hole 511. The first through-hole 511 can reserve some deformation space for the bending zone 521, and the deformation degree of the bending zone 521 is large. When the angle α between the bending zone 521 and the base portion 51 is less than 90 degrees, the angle α tends to decrease when the force is applied on one end of the bending zone 521 away from the base portion 51, and the surface facing the base portion 51 in one end of the bending zone 521 away from the base portion 51 may move toward the surface of an electrode component 20. The base portion 51 may limit the movement of one end of the bending zone 521 away from the base portion 51, and the deformation degree of the bending zone 521 is small. Therefore, in a battery cell 7 of this embodiment, the angle α between the bending zone 521 and the base portion 51 is greater than 90 degrees.

In some embodiments, the wall of a first through-hole 511 comprises two first side walls 512 and two second side walls 513. The two first side walls 512 are oppositely arranged in the circumferential direction X of a base portion 51, and the two second side walls 513 are oppositely arranged in the radial direction of the base portion 51. In some embodiments, a base portion 51 is a circular flat-plate.

In some embodiments, a first side wall 512 and a second side wall 513 may be in different shapes. In some examples, a first side wall 512 may be flat, a second side wall 513 is flat, and a first through-hole 511 is roughly trapezoidal or rectangular. In other examples, a first side wall 512 may be flat, a second side wall 513 is arc-shaped (for example, a circular arc wall), and the first through-hole 511 is roughly a fan-shaped. In other further examples, a first side wall 512 may be arc-shaped, and a second side wall 513 may be flat. In another further example, a first side wall 512 and a second side wall 513 may both be arc-shaped.

In some embodiments, the dimension of a first side wall 512 along the radial direction is less than of a second side wall 513 along the circumferential direction dimension X, and a bending zone 521 extends from the second side wall 513. Thus, the bending zone 521 is connected to the larger second side wall 513, which can ensure the connection strength and the overcurrent area between the bending zone 521 and a base portion 51.

In some embodiments, multiple first through-holes 511 are arranged, and the wall of each first through-hole 511 is connected to an elastic portion 52. Multiple elastic portions 52 are also arranged. On the premise of stratifying the contact area between an electrode component 20 and a current collector member 50, the strength of each elastic portion 52 can be reduced and the elasticity of each elastic portion 52 can be improved by increasing the number of the elastic portions 52, so that each elastic portion 52 may deform more easily under compression. In some embodiments, the number of a first through-hole 511 is the same as that of an elastic portion 52.

In some embodiments, at least a part of multiple first through-holes 511 is arranged along the circumferential direction X interval of a base portion 51. Correspondingly, at least potion of multiple elastic portions 52 is arranged along the circumferential direction X interval, so that the contact surfaces between multiple elastic portions 52 and tab portions 22 can be evenly distributed, and the current can be transmitted outwards more evenly.

In some embodiments, multiple first through-holes 511 are arranged along the circumferential direction X internal to form a first through-hole row, and multiple first through-hole rows are arranged along the radial interval of a base portion 51. In some examples, multiple first through-holes 511 in each first through-hole row have the same dimension and shape. In some examples, in two adjacent first through-hole rows, the dimension of the first through-hole 511 along the circumferential direction X in the outside first through-hole row is greater than that of the first through-hole 511 along the circumferential direction X in the inside first through-hole row. The metal foil of a tab portion 22 is winded in multiple turns, and multiple first through-hole rows allow an elastic portion 52 to contact more turns of the metal foil, so that the current can be transmitted outwards more evenly.

In some embodiments, a base portion 51 comprises a central zone 514, a first annular zone 515 and a first transition zone 516. The first annular zone 515 surrounds the outer side of the central zone 514 and is arranged against the central zone 514 by interval. The first transition zone 516 extends radially along the base portion 51 and is connected between the central zone 514 and the first annular zone 515. Multiple first transition zones 516 are arranged by equal intervals in the circumferential direction X of the base portion 51, and a first through-hole 511 is formed between the two adjacent first transition zones 516. In some examples, a first through-hole 511 is fan-shaped, and a connecting zone 522 is a fanned flat-plate, while a first annual zone 515 is a circular flat-plate. Multiple first through-holes 511 between a central zone 514 and a first annular zone 515 form a first through-role row.

In some embodiments, a wall of a central zone 514 facing a first annular zone 515 are connected to a bending zone 521.

In some embodiments, a base portion 51 further comprises a second annular zone 517 and a second transition zone 518. The second annular zone 517 surrounds the outer side of a first annular zone 515 and is arranged against the first annular zone 515 by interval. The second transition zone 518 is connected between the first annular zone 515 and the second annular zone 517, and the second transition zone 518 and a first transition zone 516 are aligned radially along a base portion 51. Multiple second transition zones 518 are arranged by equal intervals in the circumferential direction X of the base portion 51, and a first through-hole 511 is formed between the two adjacent second transition zones 518. In some examples, a first through-hole 511 is fan-shaped, and a second annular zone 517 is a circular flat-plate. Multiple first through-holes 511 between the first annular zone 515 and the second annular zone 517 form a first through-hole row.

Multiple second transition zones 518 and multiple first transition zones 516 are arranged one-to-one. A first transition zone 516 and a second transition zone 518, which are arranged one-to-one, are aligned radially along the base portion 51.

In some embodiments, a wall of a first annular zone 515 facing a second annular zone 517 is connected to a bending zone 521. In some embodiments, a first extension component 53 surrounds a second annular zone 17 and is connected to the second annular zone 517.

In some embodiments, all first through-holes 511 have the same dimensions in the radial direction of a base portion 51; correspondingly, all connecting zones 522 have the same dimensions in the radial direction of the base portion 51.

On the premise that the radius of the base portion 51 is constant, in the radial direction of the base portion 51, when the width of the first through-hole 511 is increased, the width of a central zone 514, the width of a first annular zone 515 and the width of a second annular zone 517 are required to be reduced accordingly.

In the radial direction of the base portion 51, when the width of the connecting zone 522 connected with the first annular zone 515 increases, the width of first through-hole 511 may increase accordingly, while the width of the first annular zone 515 decreases correspondingly, and the strength of the first annular zone 515 reduces. When an elastic portion 52 is deformed under compression, the pressure may be transmitted to the first annular zone 515 through the elastic portion 52. When the width of the first annular zone 515 is over-small, the first annular zone 515 is apt to deform or even tear. Therefore, in some embodiments, in the radial direction of a base portion 51, the width of a first annular zone 515 is greater than or equal to the width of a connecting zone 522 so as to ensure the strength of the first annular zone 515.

In some embodiments, a base portion 51 is provided with a through central hole 519, and a central zone 514 is annular and is arranged around the central hole 519. An electrolyte injection hole 121 and a center hole 519 are arranged one-to-one upper and lower. This allows the electrolyte to pass through the central hole 519 and infiltrate an electrode component 20 during the injection process. In some examples, a central zone 514 is a circular flat-plate.

In some embodiments, in the radial direction of a base 51, the width of a central zone 514 is greater than or equal to the width of a connecting zone 522 so as to ensure the strength of the central zone 514.

In some embodiments, a current collector member 50 can be overturned as a whole, so that the base portion 51 can be butted to an electrode component 20, and a first extension component 53 and an elastic portion 52 are butted to an end cap 12. Because the base portion 51 is a hollow structure with multiple first through-holes 511, it may also deform when squeezed by the electrode component 20, and the pressure between the base portion 51 and the electrode component 20 can be released through deformation, reducing the risk of crushing the electrode component 20 due to excessive pressure.

Figure 11:
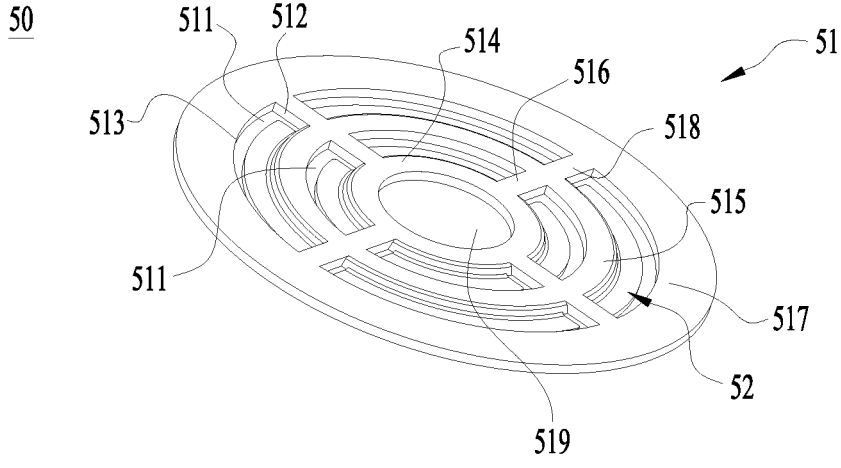
FIG. 11 is a structural schematic diagram for a current collector member of a battery cell provided in other embodiments of The present disclosure.

FIG. 11 is a structural schematic diagram for a current collector member of a battery cell provided in other embodiments of The present disclosure. As shown in FIG. 11, the extension component can also be omitted in this embodiment.

Figure 12:
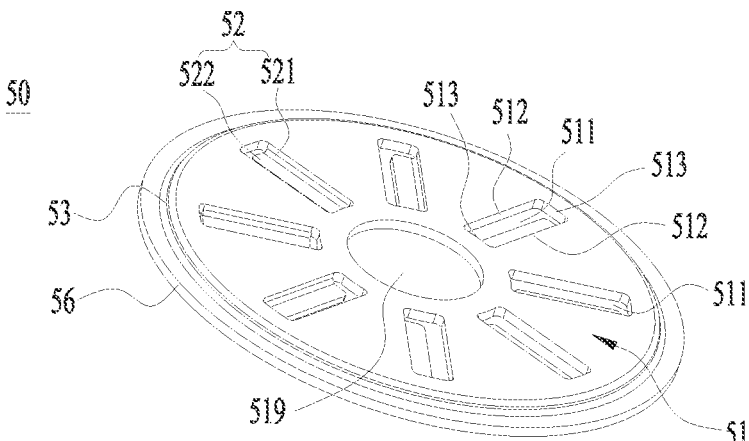
FIG. 12 is a structural schematic diagram for a current collector member of a battery cell provided in some further embodiments of The present disclosure.
Figure 13:
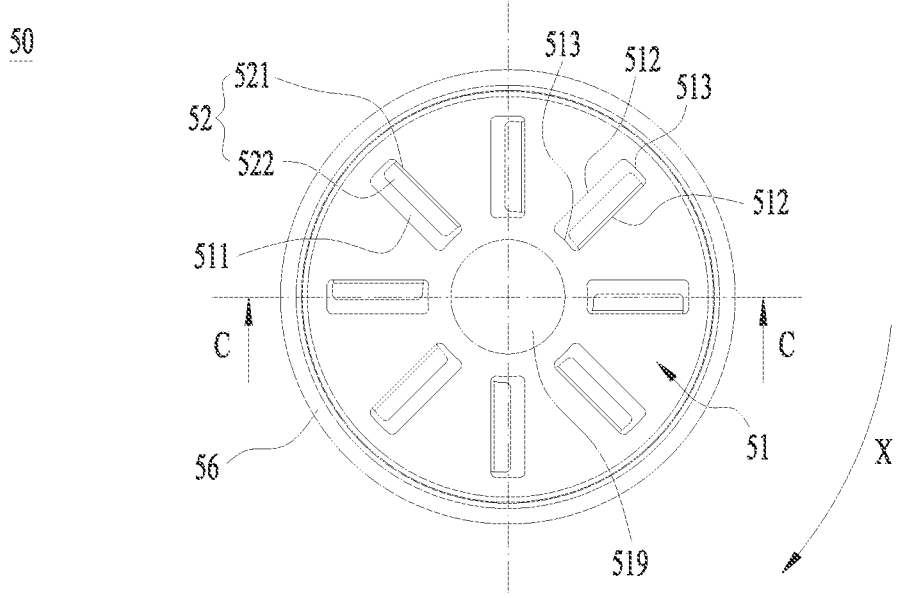
FIG. 13 is a top view of the current collector member as shown in FIG. 12.
Figure 14:
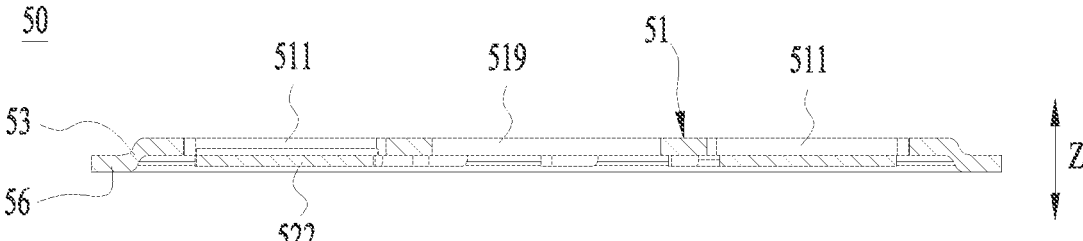
FIG. 14 is a section view of the current collector member as shown in FIG. 13 taken along a line C-C.

FIG. 12 is a structural schematic diagram for a current collector member 50 of a battery cell provided in other embodiments of The present disclosure; FIG. 13 is a top view of a current collector member 50 as shown in FIG. 12; FIG. 14 is a section view of a current collector member 50 as shown in FIG. 13 taken along a line C-C.

As shown in FIG. 12 through 14, in some embodiments, the wall of a first through-hole 511 comprises two first side walls 512 and two second side walls 513. The two first side walls 512 are oppositely arranged in a circumferential direction X of a base portion 51, and the two second side walls 513 are oppositely arranged in a radial direction of the base portion 51. The dimension of the first side wall 512 along the radial direction is larger than that of the second side wall 513 along the circumferential direction X, and a bending zone 521 extends from the first side wall 512. Thus, the bending zone 521 is connected to the larger first side wall 512, which can ensure the connection strength and overcurrent area between the bending zone 521 and the base portion 51.

In some embodiments, a first side wall 512 and a second side wall 513 are both flat, and a first through-hole 511 is roughly rectangular. In some embodiments, a first lateral wall 512 and a second lateral wall 513 can be transitioned by a fillet.

The dimension of a connecting zone 522 along the radial direction of a base portion 51 is larger than that of the connecting zone 522 along the circumferential direction X. The metal foil of a tab portion 22 is winded in multiple turns, while the connecting zone 522 has a larger dimension along the radial direction so as to touch more turns of metal foil, so that the current can be transmitted outwards more evenly.

FIG. 15 is a structural schematic diagram for a current collector member 50 of a battery cell provided in some further embodiments of The present disclosure. As shown in FIG. 15, in some embodiments, a current collector member 50 comprises multiple second through-holes 55, and an elastic portion 52 comprises multiple bending zones 521. Multiple second through-holes 55 and multiple bending zones 521 are arranged alternately along the circumferential direction X of a base portion 51. The connecting zone 522 is connected to multiple bending zones 521. In some examples, the connecting zone 522 is one. The connecting zone 522 can be a circular flat-plate.

In the embodiments of The present disclosure, the strength of each bending zone 521 can be reduced by arranging multiple second through-holes 55, so that each bending zone 521 may deform more easily. When a connecting zone 522 abuts against an electrode component and is squeezed by the electrode component, the pressure may be transmitted to multiple bending zones 521, and under the action of the pressure, the bending zone 521 may deform to release the pressure between the connecting zone 522 and the electrode component, reducing the risk of crushing the electrode component due to excessive pressure. The bending zone 521 produces an elastic force after compression deformation, and under the action of the elastic force, the connecting zone 522 is kept in contact with the electrode component, reducing the contact resistance between the electrode component and the connecting zone 522 to improve the overcurrent capacity.

In some embodiments, an elastic portion 52 is a convex hull formed by punching, and the elastic portion 52 forms a concave cavity on the side away from an electrode component.

In some embodiments, a third through-hole 522a is arranged in the middle of a connecting zone 522a, and an electrolyte injection hole is arranged against the third though-hole 522a one-to-one upper and lower. This allows the electrolyte to pass through the third through-hole 522a and infiltrate an electrode component during the injection process.

FIG. 16 is a flow schematic diagram for a manufacturing method of a battery cell provided in some embodiments of The present disclosure.

As shown in FIG. 16, a manufacturing method of a battery cell in the embodiments of The present disclosure comprises:

S100, providing an end cap;

S200, providing a current collector member, and the current collector member comprises a base portion and an elastic portion connected with the base portion;

S300, connecting a base portion to an end cap;

S400, providing an electrode component;

S500, providing a casing, and the casing has an opening;

S600, putting an electrode component into a casing through an opening;

S700, connecting an end cap connected with a current collector member to a casing in order to close the opening of the casing, so that the current collector member is electrically connected an electrode component and the end cap.

A base portion and an elastic portion are located between an end cap and an electrode component, the elastic portion at least partially protrudes from the surface of the base portion facing the electrode component and abuts against the electrode component, and the elastic portion is configured to be able to deform when squeezed by the electrode component.

Please note that, for the structure of a battery cell manufactured by the above battery cell manufacturing method, please refer to the battery cell provided in the above embodiments.

When assembling a battery cell based on the above battery cell manufacturing method, the preceding steps are not required to be performed sequentially, that is, the steps can be performed in the order referred to in the embodiments, or performed in an order different from the steps referred to in the embodiments, or several steps can be performed simultaneously. For example, step S100 and step S200 can be performed randomly or simultaneously; step S400, step S500 and step S600 can be performed first, and then step S100, step S200 and step S300 are performed.

Figure 17:
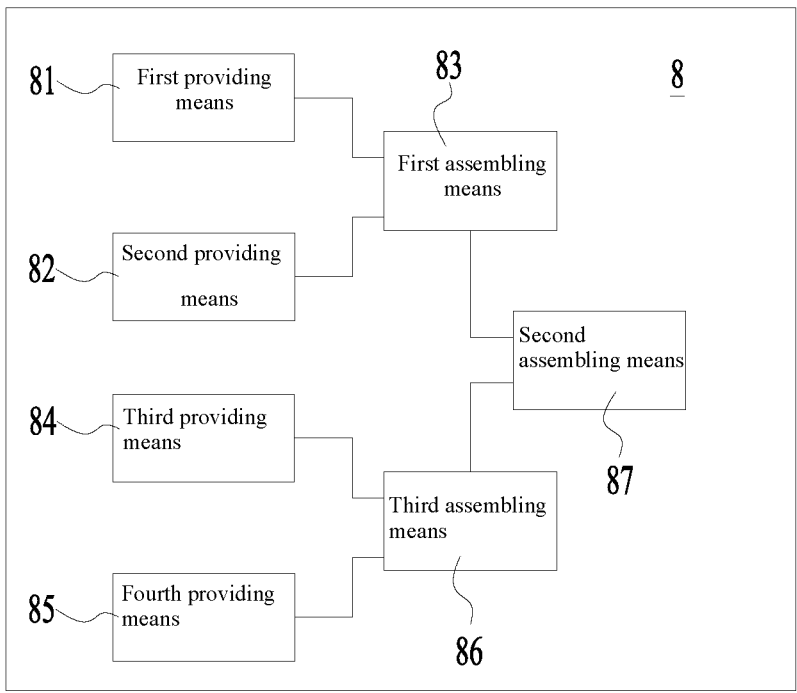
FIG. 17 is a schematic block diagram for a manufacturing system of a battery cell provided in some embodiments of The present disclosure.

FIG. 17 is a schematic block diagram for a manufacturing system of a battery cell 7 provided in some embodiments of The present disclosure.

As shown in FIG. 17, a manufacturing system 8 of a battery cell in the embodiments of The present disclosure comprises: a first providing means 81, which is used to provide an end cap; a second providing means 82, which is used to provide a current collector member, comprising a base portion and an elastic portion connected with the base portion; a first assembling means 83, which is used to connect a base portion to an end cap; a third providing means 84, which is used to provide an electrode component; a fourth providing means 85, which is used to provide a casing, and the casing has an opening; a second assembling means 86, which is used to put an electrode component into a casing through an opening; a third assembling means 87, which is used to connect an end cap connected with a current collector member to a casing in order to close the opening of the casing, so that the current collector member is electrically connected an electrode component and the end cap. A base portion and an elastic portion are located between an end cap and an electrode component, the elastic portion at least partially protrudes from the surface of the base portion facing the electrode component and abuts against the electrode component, and the elastic portion is configured to be able to deform when squeezed by the electrode component.

For the structure of a battery cell manufactured by the above-mentioned manufacturing system, please see the battery cell provided in the above embodiments.

Please note that, the embodiments of The present disclosure and features in embodiments may be mutually in case of no conflict.

Eventually, please note that, the above embodiments are simply used to describe the technical solutions of The present disclosure but are not to restrict the same. Notwithstanding the detailed description of The present disclosure with reference to the preceding embodiments, a person of ordinary skill in the art understands that, the technical solutions recorded in the preceding embodiments can be modified, or equivalent substitutions of some technical features thereof can be made. Such modifications or substitutions may not depart the essence of the technical solutions from the scope and spirit of various embodiments of The present disclosure.

What is claimed is:

1. A battery cell comprising: an electrode component comprising a main body and a tab portion extending from the main body; a casing for accommodating the electrode component, the casing having an opening; an end cap for sealing the opening of the casing; a current collector member for electrically connecting the electrode component and the end cap, the current collector member comprising a base portion and an elastic portion connected to the base portion, the base portion and the elastic portion being located between the end cap and the electrode component, the base portion being a plate and configured to connect the end cap, at least a part of the elastic portion protruding from a surface of base portion facing the electrode component and abutting the electrode component, and the elastic portion being configured to be able to deform when squeezed by the electrode component, wherein the elastic portion comprises a bending zone and a connecting zone, one end of the bending zone being connected to the base portion and bent toward the electrode component, and the connecting zone being connected to the other end of the bending zone, the electrode component has a first surface facing the end cap and a first concave portion recessed with respect to the first surface, and the connecting zone is accommodated in the first concave portion, the current collector member further comprises a first extension component and a second extension component, the first extension component is extending from an edge of the base portion towards the main body and bent against the base portion, the first extension component surrounds an outer side of the tab portion, the second extension component is connected to one end of the first extension component away from the base portion, the second extension component is parallel to the base portion and configured connect the current collector member and the end cap.

2. The battery cell according to claim 1, wherein the base portion comprises a first through-hole, and one end of the bending zone is connected to a hole wall of the first through-hole.

3. The battery cell according to claim 2, wherein in a thickness direction of the base portion, a projection of the connecting zone is within a projection of the first through-hole.

4. The battery cell according to claim 2, wherein an angle between the bending zone and the base portion is greater than 90 degrees.

5. The battery cell according to claim 2, wherein the hole wall of the first through-hole comprises two first side walls opposing each other in a circumferential direction and two second side walls opposing each other in a radial direction of the base portion, wherein a dimension of the first side walls in the radial direction is greater than a dimension of the second side walls in the circumferential direction, and the bending zone extends from the first side walls; or, a dimension of the first side walls in the radial direction is less than a dimension of the second side walls in the circumferential direction, and the bending zone extends from the second side walls.

6. The battery cell according to claim 2, wherein a plurality of first through-holes are provided, and the wall of each of the first through-holes is connected with the elastic portion.

7. The battery cell according to claim 6, wherein at least a part of plurality of first through-holes is arranged at intervals in the circumferential direction of the base portion.

8. The battery cell according to claim 7, wherein the base portion comprises a central zone, a first annular zone and first transition zones, the first annular zone surrounding an outer side of the central zone and spaced from the central zone, and at least one of the first transition zones extending in the radial direction of the base portion and connected between the central zone and the first annular zone;

the first transition zones are provided and arranged by equal intervals in the circumferential direction of the base portion, and the first through-hole is formed between two adjacent the first transition zones; and a wall of the central zone facing the first annular zone is connected to the bending zone.

9. The battery cell according to claim 8, wherein the base portion further comprises a second annular zone and second transition zones, the second annular zone surrounding an outer side of the first annular zone and spaced from the first annular zone, and at least one of the second transition zones being connected between the first annular zone and the second annular zone, and the at least one of the second transition zones and the at least one of the first transition zones being aligned in the radial direction of the base portion;

the second transition zones are provided and arranged by equal intervals in the circumferential direction of the base portion, and the first through-hole is formed between two adjacent second transition zones; and a wall of first annular zone facing the second annular zone is connected to the bending zone.

10. The battery cell according to claim 1, wherein the current collector member comprises a plurality of second through-holes, the elastic portion comprises a plurality of the bending zones, and the plurality of the second through-holes and the plurality of bending zones are alternately arranged in the circumferential direction of the base portion; and the connecting zone is connected to the plurality of the bending zones.

11. The battery cell according to claim 1, wherein a thickness of the bending zone is less than a thickness of the base portion; and/or a thickness of the connecting zone is less than the thickness of the base portion.

12. The battery cell according to claim 1, wherein a roughness of a surface of the connecting zone facing the electrode component is greater than a surface roughness of the base portion.

13. The battery cell according to claim 1, wherein the first surface is in contact with the base portion.

14. The battery cell according to claim 1, wherein the end cap has a second surface facing the electrode component and a second concave portion recessed with respect to the second surface, and at least a part of the base portion is accommodated in the second concave portion.

15. The battery cell according to claim 14, wherein the base portion is welded to the end cap; and/or the base portion is in interference fit into the second concave portion.

16. The battery cell according to claim 1, wherein the tab portion being located between the main body and the end cap; the first extension component and the base portion form a third concave portion, a part of the tab portion extending into the third concave portion, and at least a part of the elastic portion being accommodated in the third concave portion and abutting the tab portion.

17. A battery comprising at least one battery cell according to claim 1.

18. An electrical device comprising the battery according to claim 17, wherein the battery is configured to provide electricity.

* * * * *